Patented May 9, 1933

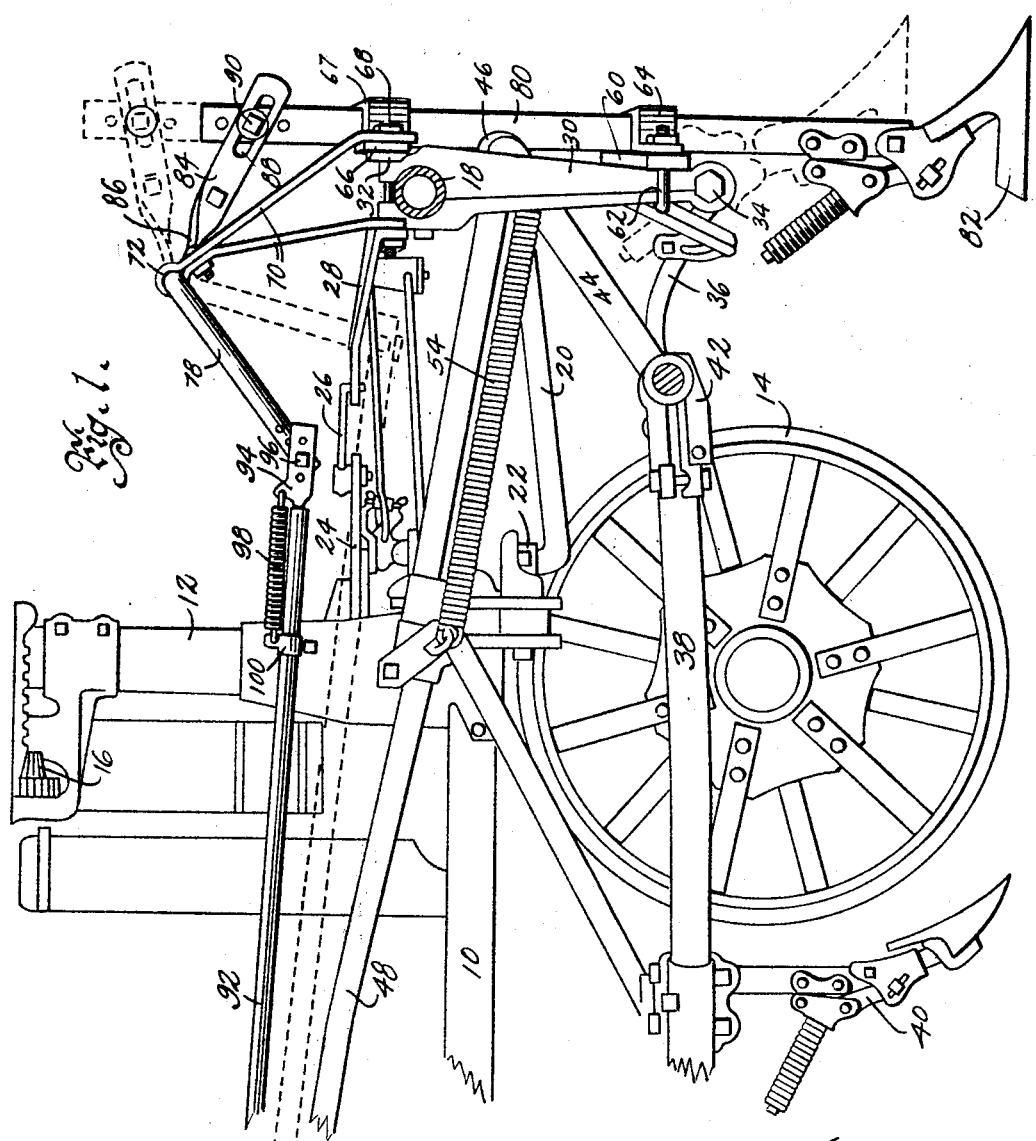

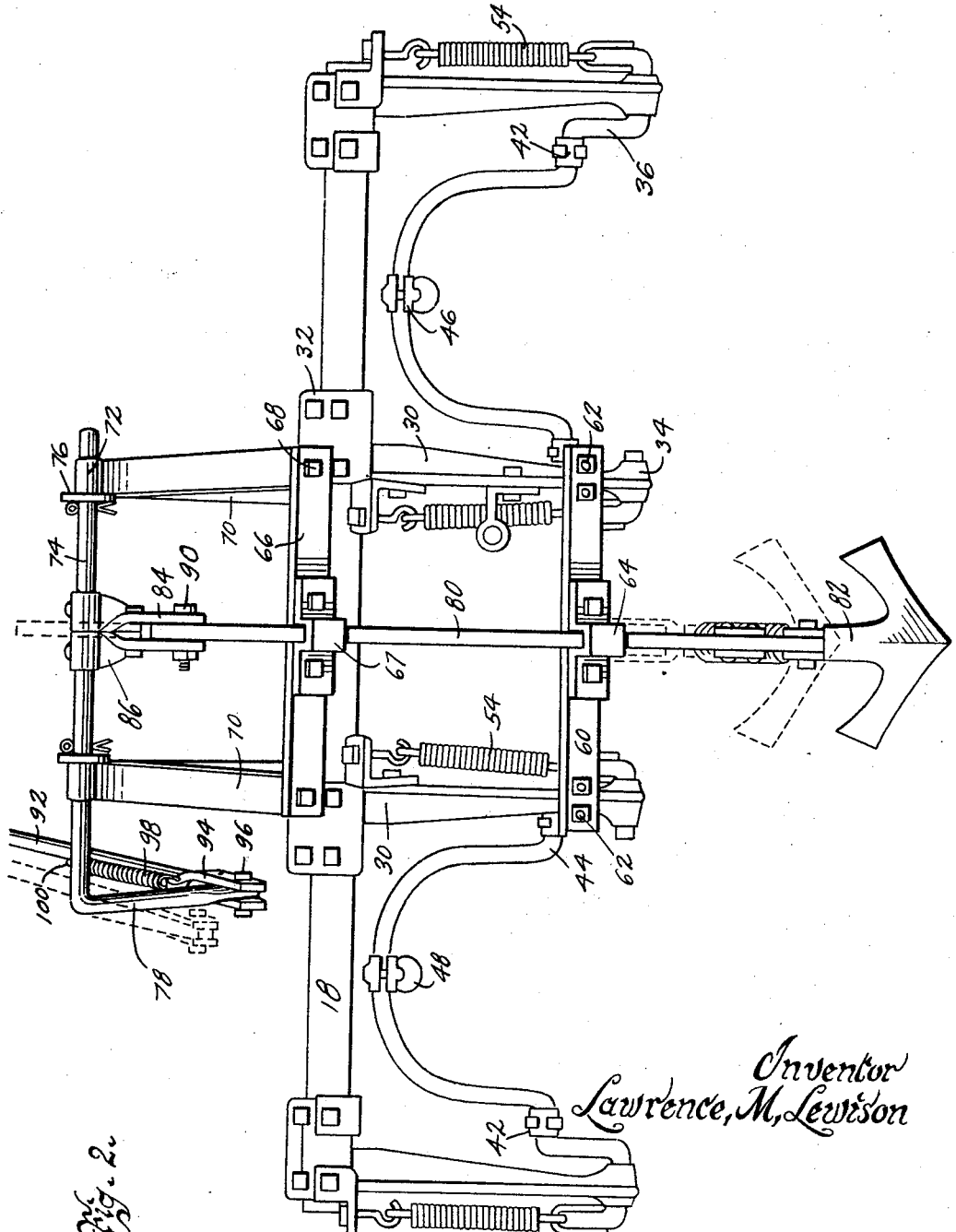

1,907,842

UNITED STATES PATENT OFFICE

LAWRENCE M. LEWISON, OF SIOUX RAPIDS, IOWA

GROUND LEVELING ATTACHMENT FOR TRACTOR CULTIVATORS

Application filed October 3, 1932. Serial No. 635,909.

The object of this invention is to provide an improved attachment for tractor cultivators, the function of the attachment being to level the ground in advance of the forward wheels of the tractor, particularly when the machine is employed for cross-cultivating, and thereby preventing the continuous jolting which would be imparted to the machine in traveling across alternate ridges and trenches formed by a previous cultivating operation.

A further object of the invention is to provide an improved ground leveling attachment for tractor cultivators so arranged that a shovel or sweep may be caused to engage and level the surface in advance of the front tractor wheels, said ground leveling member being capable of conjunctive movement to and from operative position through actuation of the mechanism for adjusting the position of the cultivating devices.

Still another object of the invention is to provide an attachment of the character set forth which may be attached to the tractor cultivator and tractor without making any changes or alterations in the original construction of the mechanism.

Another object of the invention is to provide an attachment of the character set forth which is efficient and yet simple and comparatively inexpensive as well as capable of being easily and quickly attached to the machine.

With these and other objects in view my invention consists in the construction, arrangement and combination of the various parts of my device, whereby the objects contemplated are attained, as hereinafter more fully set forth, pointed out in my claims, and illustrated in the accompanying drawings, in which:—

Figure 1 is a side elevation illustrating a portion of a tractor equipped with a tractor cultivator and having my improved ground leveling attachment applied thereto, the dotted lines indicating the inoperative position of the leveling mechanism.

Figure 2 is a front perspective view showing the attachment applied to the frame of a tractor cultivator.

In raising some crops, such as corn, it is customary to plant the seed in such manner that the plants are arranged in rows not only lengthwise but also crosswise of the field. In cultivating such crops it is customary to cultivate first in one direction and then in another direction at right angles thereto and such cross-cultivation, as it is sometimes called, makes it necessary, after the first cultivating operation, to travel across the alternate ridges and trenches which are formed by previous cultivating operations. When tractor operated machinery is employed for such cultivation, the rate of travel is considerably faster than with the old type of horse-drawn machinery, and the consequent jolting caused by driving across these ridges is very uncomfortable to the operator and also imposes an additional strain on the tractor and cultivator.

It is for the purpose of relieving this discomfort and strain, not only with respect to the operator but also upon the machine, that my present invention has been designed. It involves the use of a ground leveling shovel or sweep which is arranged to travel in advance of the forward wheel or wheels of the tractor, thereby leveling off the ridges at the points where the front wheels are to travel. This attachment is adapted to be applied to the frame work of the cultivator which is carried by the tractor and the ground leveling member is capable of being moved into and out of operative position by and through the same mechanisms which are employed to obtain similar movements of the cultivating devices.

The tractor to which the mechanism is here shown as being attached is of the type known as the "row crop" type, having a single wheel or a pair of wheels placed close together at the front of the tractor for supporting and guiding the machine. It is to be understood, however, that my attachment may be applied to different types of tractors equipped with different cultivating attachments from those shown in the drawings and about to be described.

The tractor in general includes a frame 10 having a steering column or front axle shaft 12 vertically arranged at its forward end and having suitable means for connection to the front wheel or wheels designated by the numeral 14, in such manner that the wheels may be permitted to rotate and may also be turned on a vertical axis for steering. The steering operation is accomplished from the driver's seat by mechanism including gearing 16 suitably connected to the upper end of the steering column 12.

The tractor cultivator is adapted to be applied directly to the tractor in such manner that the cultivating devices are arranged somewhat rearwardly and outside of the line of draft of the wheels 14 and are controlled by mechanism located near the operator's seat.

In the type of tractor cultivator herein shown there is employed a frame or support including a tubular main beam 18 which is arranged transversely in a position in front of the tractor, and the cultivator gangs are arranged in trailing relation with respect to said frame and beam.

A pair of supporting and shifting arms 20 are provided, these members being turned upwardly at their rear ends and journaled in bearings 22 at the forward end of the tractor frame 10. At their forward ends the arms 20 are provided with similar pivotal connections to the frame which includes the main beam 18 and by this means said frame is supported in front of the tractor and is permitted to shift in a direction transversely of the tractor.

To the steering post or front axle shaft 12 is rigidly fixed a shifting lever 24 which projects forwardly and has connections through a link 26 and arm 28 with the main frame whereby said frame, including the main beam 18, is moved transversely of the line of travel, through an arc, in accordance with rotary movement of the member 12, as the steering wheels 14 of the tractor are turned. The pivotal connection of the main frame through the pivoted shifting arms 20 permits the shifting movement so that the cultivating devices are caused to conform substantially to movements of the tractor from a straight line.

A plurality of bracket arms 30 are fixed by means of clamping devices 32 to the main beam 18 at spaced intervals, said bracket arms having bearings 34 at their lower ends. For the two-row type of cultivator there are two of the bracket arms 30 on each side of the center line of the machine and in each pair of said arms is journaled an arched shaft 36, each having at its ends journal portions rotatably engaged in the bearings 34 and at its center a decidedly arched portion.

Each of the cultivator gangs includes cultivator beams 38 carrying at their rear ends any suitable type of cultivating devices 40. At their forward ends the beams 38 are provided with bearings 42 which engage journal portions 44 on the arched shafts 36.

At the centers of the arched portions of the shafts 36 are bearing members 46 which are attached to the forward ends of elongated control bars 48 extending rearwardly on opposite sides of the tractor. The control bars 48 are pivotally engaged at their rear ends with pivots 50 carried by control levers 52 adapted for manual actuation by the operator to raise and lower the cultivating devices and thus place them selectively in inoperative or operative positions. The operation of regulating the positions of the cultivator devices is accomplished by moving the levers 52 through arcs for rocking the arched shafts 36, the forward movement of the levers permitting the beams 38 of the cultivator gangs to be lifted by the action of the lifting springs 54 each fixed at one end to a part of the main frame of the cultivator and at its opposite end to a part on the arched shaft. The control levers 52 are provided with suitable detent devices 56 for engagement with notched segments 58 whereby said levers will be held in any position to which they are adjusted manually.

The elements thus far described are common and well known and constitute portions of the structure of the tractor and tractor-mounted cultivator. They have been illustrated and described to the foregoing extent merely for the purpose of furnishing a basis for the description of my improvements which are applied thereto. It is to be understood, however, that the use of my improved attachment is not confined to the particular type of tractor or tractor cultivator which is herein shown and described.

In carrying out my invention I employ a lower frame bar 60 which is arranged transversely and is secured by U-bolts or the like 62 to the lower end portions of the two intermediate bracket arms 30 of the main frame. The frame bar 60 carries in its central portion a vertically arranged slide bearing 64.

I also employ an upper frame bar 66 which is arranged transversely adjacent the central portion of the main beam 18 and which may be supported by some of the bolts 68 which are employed for the two intermediate clamping devices 32. The upper frame bar 66 is provided at its center with a vertically arranged slide bearing 67 which is in alignment with the slide bearing 64.

Bearing brackets 70 are arranged near the end portions of the upper frame bar 66 and extend upwardly and somewhat rearwardly, these brackets being supported by the same bolts 68 which are employed for the frame bar 66. The brackets 70 are provided with bearings 72 at their upper ends and in these bearings is journaled a rock shaft 74 which is held against longitudinal movement by set collars 76. The rock shaft 74 is provided at its end with a downwardly extending crank arm 78.

A shovel beam 80 is arranged for vertical sliding movement in the bearings 64—68 and carries at its lower end a ground leveling member 82. The member 82 may be of any suitable form and construction, such as a shovel or sweep, for smoothing the surface of the ground in advance of the forward tractor wheel or wheels 14, preferably being so arranged as to throw the dirt to both sides of the center line of travel.

A lifting arm 84 is rigidly attached at one end as by means of a clamp device 86 to the central portion of the rock shaft 74 and said arm extends forwardly and is formed with a longitudinal slot 88 through which extends a bolt 90 seated in the vertical shovel beam 80. When the shaft 74 is rocked the lifting arm 84 functions to raise or lower the beam 80, thereby placing the ground leveling member 82 in inoperative or operative position.

A control bar for the ground leveling device is provided and as here shown is formed in two parts, namely a tubular member 92 and a telescoping member 94 slidably mounted in the forward end thereof. The member 94 is pivoted to the lower end of the crank arm 78 by a bolt or the like 96 and this connection preferably is adjustable as indicated in Figure 1. The member 94 normally is yieldingly held rearwardly to the extent of telescoping action by means of a stiff coil spring 98 fixed at one end thereto and at its opposite end to a set collar 100 on the tubular member 92.

The member 92 of the control bar is provided at its rear end with a reduced shank 102 which pivotally engages the pivot member 50 of the control lever 52 whereby the control bar for the ground leveling device is shifted simultaneously with the movements of the control bar 48 for the cultivator gangs. In other words—when the control lever 52 is moved forwardly, as indicated by dotted lines in Figure 1, for the purpose of permitting the cultivator gangs to be lifted to inoperative position, this movement likewise results in a forward shifting of the control bar 92—94 and a rocking movement of the shaft 74, this latter movement resulting in a lifting of the shovel beam 80 and ground leveling member 92 as also indicated by dotted lines. A reverse movement of the parts will result in placing the cultivating device in operative position and also placing the member 92 in position for leveling off the ridges and trenches over which the machine may be traveling.

This attachment is readily applied to a tractor and tractor-mounted cultivator without making any changes whatever in the construction of the latter and without the necessity for drilling holes, the only change required being the substitution of longer bolts 68 or pivot members 50 for connecting certain of the parts.

The use of this attachment results in greatly increased comfort and convenience to the operator because it eliminates the jolting which would be occasioned by rather rapid travel of the machine over rough ground, particularly in the operation of cross-cultivating as previously set forth. It is also of advantage in thereby eliminating some of the strain on the tractor and cultivator so that more efficient operation is secured.

The cushioning spring 98 between the two parts of the control bar 92 and 94 is supplied for the purpose of permitting a yielding movement of the member 94 outwardly of the tubular member 92. This provides means to prevent injury to the mechanism in the event the leveling member 82 should pass over a stone or other obstruction.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:—

1. A ground-leveling attachment for a tractor cultivator having a frame and having cultivating devices carried by the frame and adjustable to and from operative position, said attachment comprising frame members adapted to be mounted on the supporting frame of the cultivator, a beam carried by said frame members, and a leveling member carried by said beam and adapted to travel in advance of the forward wheels of the tractor, said beam being movable relative to said frame members whereby the leveling member may be moved to and from ground-engaging position, together with means for moving said beam simultaneously as the cultivating devices are moved to and from operative position.

2. A ground leveling attachment for tractor cultivators comprising frame members adapted to be mounted on the supporting frame of the cultivator, a beam mounted for vertical sliding movement on said frame members, a leveling member carried by said beam and adapted to travel in advance of the forward wheels of the tractor, a rock shaft rotatably carried by said frame members, an arm on said rock shaft having a pivotal connection with said beam, a crank arm on said rock shaft, and a manually actuated control bar pivotally connected with said crank arm for rocking said shaft and thereby moving the leveling member to and from ground-engaging position.

3. A ground-leveling attachment for a tractor cultivator having a frame and having cultivating devices carried by the frame and adjustable to and from operative position, said attachment comprising frame members adapted to be mounted on the supporting frame of the cultivator, a beam mounted for vertical sliding movement on said frame members, a leveling member carried by said beam and adapted to travel in advance of the forward wheels of the tractor, a rock shaft rotatably carried by said frame members, an arm on said rock shaft having a pivotal connection with said beam, a crank arm on said rock shaft, and a manually actuated control bar pivotally connected with said crank arm for rocking said shaft and thereby moving the leveling member to and from ground-engaging position, said control bar being operatively connected to the devices employed for moving the cultivating device to and from operative position.

4. A ground-leveling attachment for tractor cultivators comprising frame members adapted to be mounted on the supporting frame of the cultivator, a beam mounted for vertical sliding movement on said frame members, a leveling member carried by said beam and adapted to travel in advance of the forward wheels of the tractor, a rock shaft rotatably carried by said frame members, an arm on said rock shaft having a pivotal connection with said beam, a crank arm on said shaft, and a manually actuated control bar pivotally connected with said crank arm for rocking said shaft and thereby moving the leveling member to and from ground-engaging position, said control bar being formed in two relatively movable parts having a spring connection between them to permit relative yielding of the parts when the leveling member engages an obstruction.

5. A ground-leveling attachment for a tractor cultivator having a frame bar arranged transversely at the front of a tractor and also having bracket arms depending from said frame bar for supporting portions of the cultivating mechanism and having cultivating devices movable to and from operative position; said attachment comprising frame bars fixed in spaced relation to said beam and bracket arms, slide bearings carried by said frame bars, a beam slidably mounted in said bearings, a leveling member on the lower end of said beam, a rock shaft having a pivotal connection with said beam, and means for rocking said shaft for moving said beam and thereby moving the leveling member to and from ground-engaging position simultaneously with the positioning of the cultivating devices to operative and inoperative positions.

Des Moines, Iowa, September 16, 1932.

LAWRENCE M. LEWISON.